United States Patent
Wu et al.

(10) Patent No.: US 12,048,612 B2
(45) Date of Patent: Jul. 30, 2024

(54) METHOD OF OPERATING INTRAORAL SCANNER FOR FAST AND ACCURATE FULL MOUTH RECONSTRUCTION

(71) Applicant: QISDA CORPORATION, Taoyuan (TW)

(72) Inventors: Chuang-Wei Wu, Taoyuan (TW); Hung-Chih Chan, Taoyuan (TW); Tsung-Hsi Lee, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 452 days.

(21) Appl. No.: 17/539,153

(22) Filed: Nov. 30, 2021

(65) Prior Publication Data
US 2023/0048005 A1   Feb. 16, 2023

(30) Foreign Application Priority Data
Aug. 16, 2021 (CN) .......................... 202110935523.5

(51) Int. Cl.
| | |
|---|---|
| G06T 19/00 | (2011.01) |
| A61C 5/50 | (2017.01) |
| A61C 9/00 | (2006.01) |
| A61C 13/00 | (2006.01) |
| A61C 19/05 | (2006.01) |
| G06T 7/00 | (2017.01) |
| G06T 19/20 | (2011.01) |

(52) U.S. Cl.
CPC ............ *A61C 9/0053* (2013.01); *A61C 19/05* (2013.01); *G06T 7/0012* (2013.01); *G06T 19/00* (2013.01); *G06T 19/20* (2013.01); *G06T 2207/10028* (2013.01); *G06T 2207/30036* (2013.01); *G06T 2210/41* (2013.01)

(58) Field of Classification Search
CPC ..... A61C 9/0053; A61C 9/05; A61C 13/0019; A61C 13/0004; A61C 13/34; A61C 5/50; A61C 7/002; G06T 7/0012; G06T 19/00; G06T 19/20; G06T 2207/10028; G06T 2207/30036; G06T 2210/41; G06T 2200/24; A61B 5/1079; A61B 5/0059; A61B 1/00193; A61B 1/00194; A61B 1/046; A61B 1/00016; A61B 5/24
USPC ......................................................... 345/419
See application file for complete search history.

(56) References Cited

U.S. PATENT DOCUMENTS

| | | | |
|---|---|---|---|
| 9,782,236 B2 * | 10/2017 | Sporbert .............. | A61C 9/0046 |
| 10,307,221 B2 * | 6/2019 | Cinader, Jr. ............. | A61C 7/00 |
| 11,628,047 B2 * | 4/2023 | Wu ........................ | A61C 7/002 |
| | | | 433/213 |

(Continued)

*Primary Examiner* — Wesner Sajous

(57) ABSTRACT

An intraoral scanner includes an image capturing device and a processor. A method of operating the intraoral scanner includes the image capturing device sequentially capturing M images of a buccal bite, the processor generating M sets of buccal bite point clouds according to the M images, the processor matching the M sets of buccal bite point clouds to generate a bite model, when the number of data points of the bite model exceeds a first threshold, the processor computing P sets of bite feature descriptors of the bite model, when a predetermined quantity of bite feature descriptors in a set of bite feature descriptors of the P sets of bite feature descriptors exceeds a second threshold, the processor performing a registration on an upper arch model and a lower arch model to the buccal bite mode to generate a full mouth model.

18 Claims, 6 Drawing Sheets

(56) References Cited

U.S. PATENT DOCUMENTS

| | | | |
|---|---|---|---|
| 2005/0153257 A1* | 7/2005 | Durbin | B33Y 80/00 |
| | | | 433/68 |
| 2015/0145856 A1* | 5/2015 | Sporbert | A61C 7/00 |
| | | | 345/419 |
| 2019/0231492 A1* | 8/2019 | Sabina | A61C 13/0004 |
| 2020/0188068 A1* | 6/2020 | Elbaz | A61C 9/0053 |
| 2021/0128282 A1* | 5/2021 | Elbaz | A61B 1/00045 |
| 2023/0240820 A1* | 8/2023 | Sabina | A61B 1/000096 |
| | | | 348/66 |
| 2024/0115361 A1* | 4/2024 | Elbaz | A61B 5/1079 |

\* cited by examiner

METHOD OF OPERATING INTRAORAL SCANNER FOR FAST AND ACCURATE FULL MOUTH RECONSTRUCTION

BACKGROUND OF THE INVENTION

1. Field of the Invention

The present invention relates to intraoral scanning, and in particular, to an operating method of an intraoral scanner.

2. Description of the Prior Art

The intraoral scanner uses laser light to scan the teeth quickly, and then uses software to build a teeth model for medical personnel to perform teeth reconstruction, orthodontic treatments or other clinical applications. The teeth reconstruction may involve the use of dental braces, dental bridges, dental implants and other dentures to reconstruct missing or bad teeth. The orthodontic treatments utilize orthodontic devices to improve abnormal occlusion of teeth. Accurate teeth models are used to prepare suitable dentures or orthodontic devices to lower the risk of dental surgery.

In the related art, the intraoral scanner is used to perform a bite scan to obtain an accurate model. However, the existing bite scan is complicated in procedure and the scan length may be inadequate. A short scan length cannot produce an accurate model. A long scan length will increase the amount of computation of the intraoral scanner, slowing down the model reconstruction speed and causing discomfort to the patient.

SUMMARY OF THE INVENTION

According to an embodiment of the invention, an intraoral scanner includes an image capturing device and a processor, and a method of operating the intraoral scanner includes the image capturing device sequentially capturing M images of a buccal bite, the processor generating M bite point clouds according to the M images, and the processor matching the M bite point clouds to generate a bite model. The method further includes when a quantity of data points of the bite model exceeds a first threshold, the processor computing P sets of bite feature descriptors of the bite model, and when a predetermined quantity of bite feature descriptors in a set of bite feature descriptors of the P sets of bite feature descriptors exceeds a second threshold, the processor performing a registration on an upper arch model and a lower arch model to the buccal model to generate a full mouth model. M and P are positive integers.

According to an embodiment of the invention, an intraoral scanner includes the image capturing device sequentially capturing M images of a buccal bite, the processor generating M sets of bite point clouds according to the M images, the processor down-sampling the M bite point clouds to generate M down-sampled bite point clouds, and the processor matching the M down-sampled bite point clouds to generate a bite model. The method further includes when a quantity of data points of the bite model exceeds a first threshold, the processor computing P sets of bite feature descriptors of the bite model, and when a predetermined quantity of bite feature descriptors in a set of bite feature descriptors of the P sets of bite feature descriptors exceeds a second threshold, the processor performing a registration on an upper arch model and a lower arch model to the buccal model to generate a full mouth model. M and P are positive integers.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
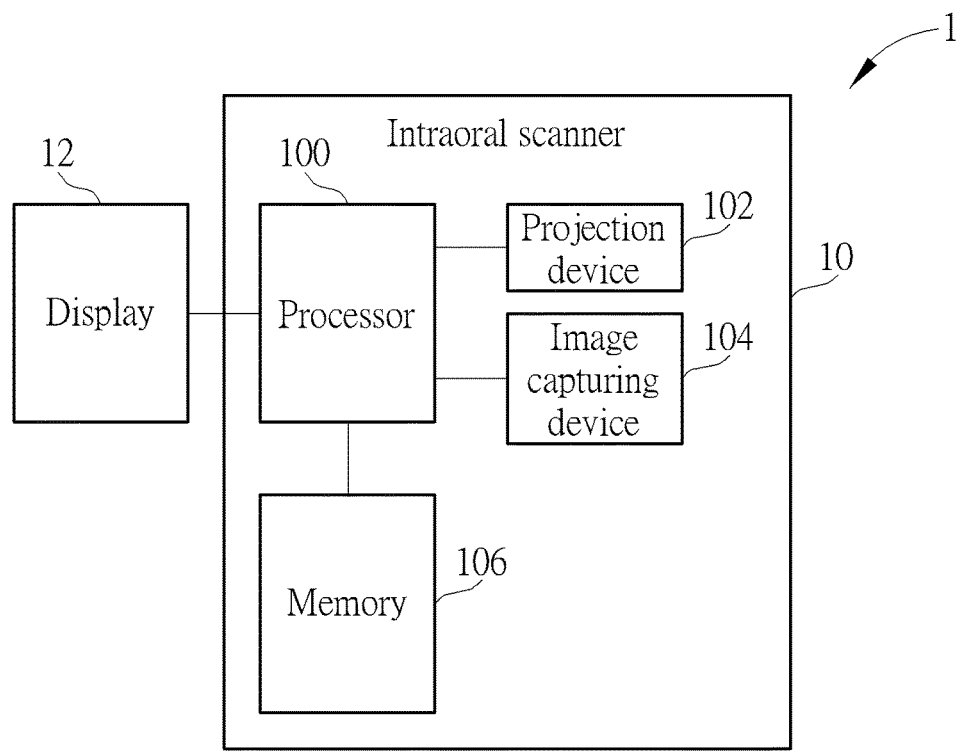
FIG. 1 is a block diagram of an intraoral scanner system according to an embodiment of the invention.
Figure 2:
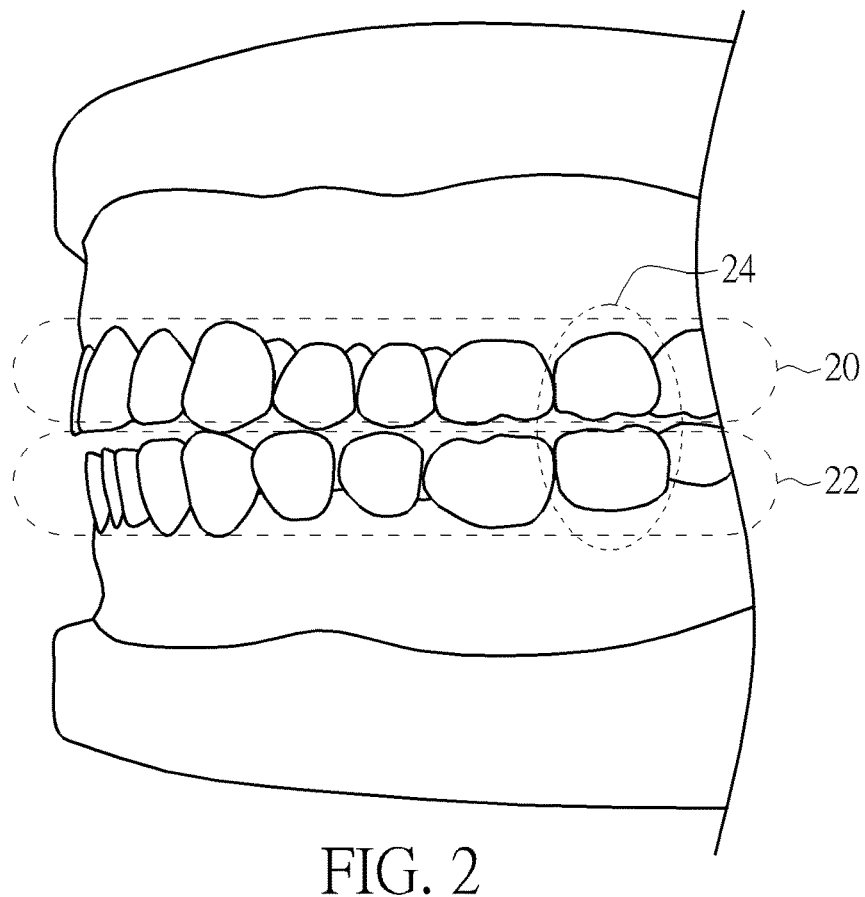
FIG. 2 is a schematic diagram of a dental scan area according to an embodiment of the invention.

FIG. 1 is a block diagram of an intraoral scanner system 1 according to an embodiment of the invention. The intraoral scanner system 1 may include an intraoral scanner 10 and a display 12 coupled thereto. The intraoral scanner 10 may be a handheld intraoral scanner, and may be coupled to the display 12 in a wired or wireless manner. An operator may operate the intraoral scanner 10 to scan a patient's mouth to reconstruct a full mouth model, and the display 12 may display the reconstructed full mouth model. Referring to FIG. 2, FIG. 2 shows a schematic diagram of a dental scan area according to an embodiment of the invention. The dental scan area is scanned for reconstructing a full mouth model.

When the intraoral scanner 10 is used to reconstruct the full mouth model, the intraoral scanner 10 may scan an upper arch area 20 to obtain a plurality of upper arch images and create an upper arch model according to the plurality of upper arch images, and scan a lower arch area 22 to obtain a plurality of lower arch images and create a lower arch model according to the plurality of lower arch images. Next, in order to obtain a relative positional relationship between the upper arch model and the lower arch model, the intraoral scanner 10 may scan a buccal bite area 24 to obtain a plurality of bite images, and create a bite model according to the plurality of bite images. The bite model includes a part of the upper arch model and a part of the lower arch model. Finally, the intraoral scanner 10 may perform a registration on the upper arch model and the lower arch model with respect to the bite model, and adjust the upper arch model and the lower arch model to correct relative positions thereof to generate a full mouth model. Since the bite model is primarily used to align the upper arch model and the lower arch model to increase the accuracy of the full mouth model, the bite model may be a model of a partial buccal bite, and the intraoral scanner 10 may scan the partial buccal bite to create the bite model. The intraoral scanner 10 may determine whether a scan area of the buccal bite is sufficient to build the bite model. If so, the operator may be notified to terminate scanning, relieving discomfort to the patient owing to pretense of the intraoral scanner 10, reducing an amount of computations of the intraoral scanner 10, while reducing the time required to establish the full mouth model. The intraoral scanner system 1 may perform computations and display the result in real time, enabling the operator to view the scanning result in real time, allowing the operator to check whether the quality of the current full mouth model is satisfactory, reducing the scanning time while enhancing the quality of the full-mouth scan.

The intraoral scanner 10 may include a processor 100, a projection device 102, an image capturing device 104 and a memory 106. The processor 100 may be coupled to the projection device 102, the image capturing device 104, the memory 106, and the display 12 to control operations thereof. The projection device 102 may project a pre-programmed pattern onto surfaces of the tooth sample along a predetermined scan path. The imaging device 104 may scan the tooth sample along the predetermined scan path to obtain a plurality of two-dimensional images of the surface of the object. The tooth sample may be a full upper arch, a partial upper arch, a full lower arch, a partial lower arch, and a buccal bite. The predetermined pattern may be a structured light pattern such as a checkerboard pattern, stripes, circles, a cross pattern, a gray coded pattern, a color coded pattern, other coded patterns or a random pattern. When the predetermined pattern is projected onto the surfaces of the tooth samples of different shapes, textures and/or depths, the pattern will be deformed. The two-dimensional image may show a deformation of the predetermined pattern. The processor 100 may compute three-dimensional (3D) data points of the surface feature points of the tooth sample according to the original predetermined pattern and the deformed predetermined pattern. A set of 3D data points may be used to generate a 3D model of the tooth sample, referred to as a point cloud. The processor 100 may generate a plurality of point clouds based on the plurality of 2D images, and match the plurality of point clouds using a matching algorithm and/or a data post-processing program to generate the 3D model of the tooth sample. The memory 106 may be a non-volatile memory such as a random access memory or a hard drive. The memory 106 may store images and data points of the plurality of point clouds. Specifically, the memory 106 may store the upper arch images, the lower arch images, and the bite images, and may store the upper arch model, the lower arch model, and the bite model.

Figure 3:
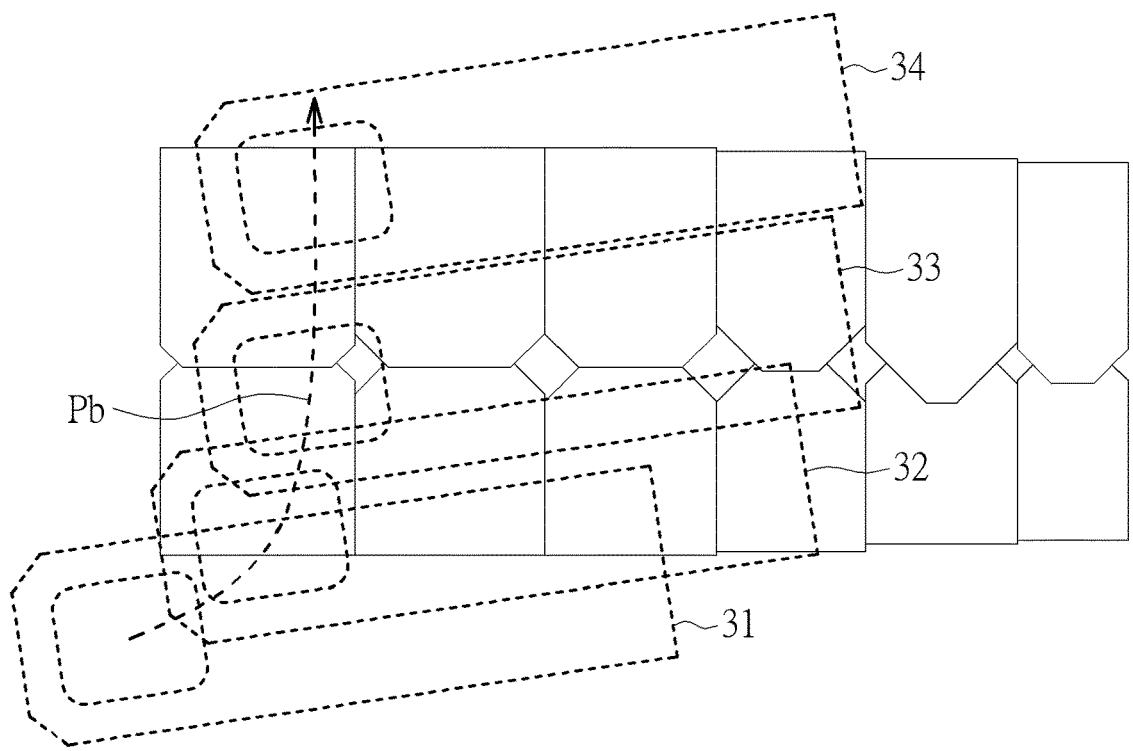
FIG. 3 is a schematic diagram of a scan method adopted by the intraoral scanner in FIG. 1.

FIG. 3 is a schematic diagram of a scan method adopted by the intraoral scanner 10. The scan method is used to establish the bite model. The intraoral scanner 10 may scan along a bite scan path Pb to obtain bite images 31 to 34 in sequence. The processor 100 may respectively generate a first bite point cloud to a fourth bite point cloud according to the bite images 31 to 34, and match according to a matching algorithm the adjacent bite point clouds of the first bite point cloud to the fourth bite point cloud to generate the bite model. The matching algorithm may be an iterative closest point algorithm (ICP). For example, when matching the first bite point cloud and the second bite point cloud, the processor 100 may transform a plurality of data points in the second bite point cloud to reduce or minimize differences between a plurality of data points in the first bite point cloud and the plurality of data points in the second bite point cloud. The intraoral scanner 10 may scan the upper arch and the lower arch using a similar scan method to create the upper arch model and the lower arch model, respectively.

Figure 4:
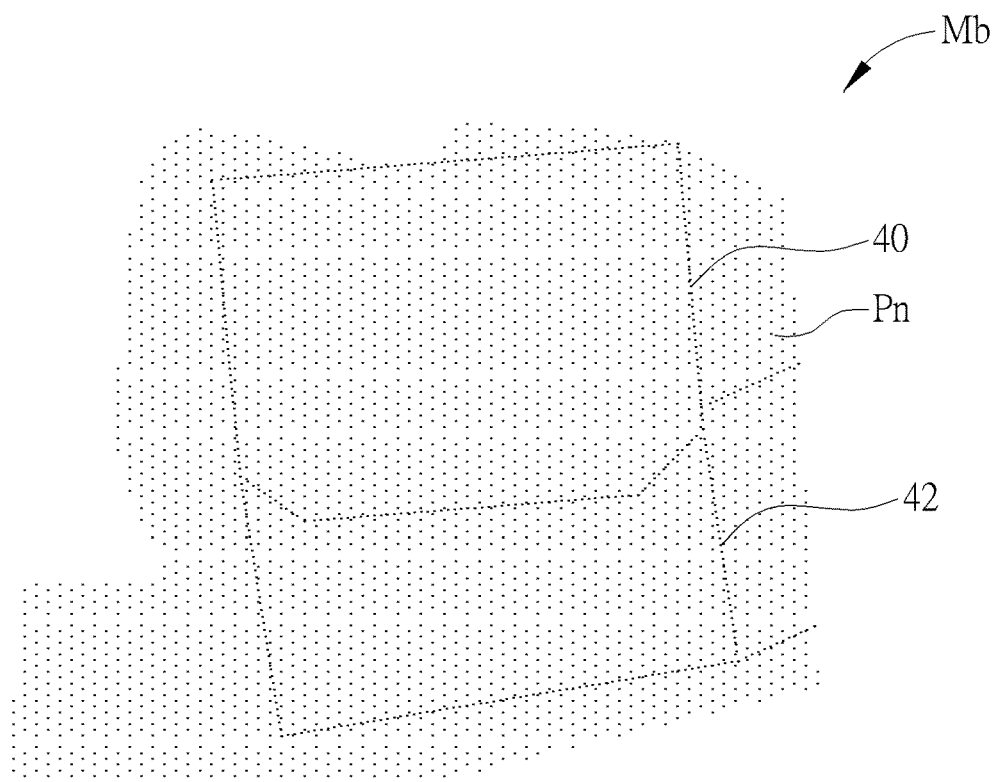
FIG. 4 is a schematic diagram of a bite mode according to an embodiment of the invention.

FIG. 4 is a schematic diagram of a bite mode Mb according to an embodiment of the invention. The bite model Mb includes a plurality of data points Pn. The data points Pn may include feature points of a tooth, such as an edge or a corner of the tooth, so as to determine the position thereof. The bite model Mb shows that the tooth 40 of the upper arch and the tooth 42 of the lower arch are aligned with each other. The processor 100 may align the upper arch model and the lower arch model using the tooth 40 and the tooth 42 of the bite model Mb, respectively, so as to adjust the upper arch model and the lower arch model, and then to generate an accurate full mouth model.

Figure 5:
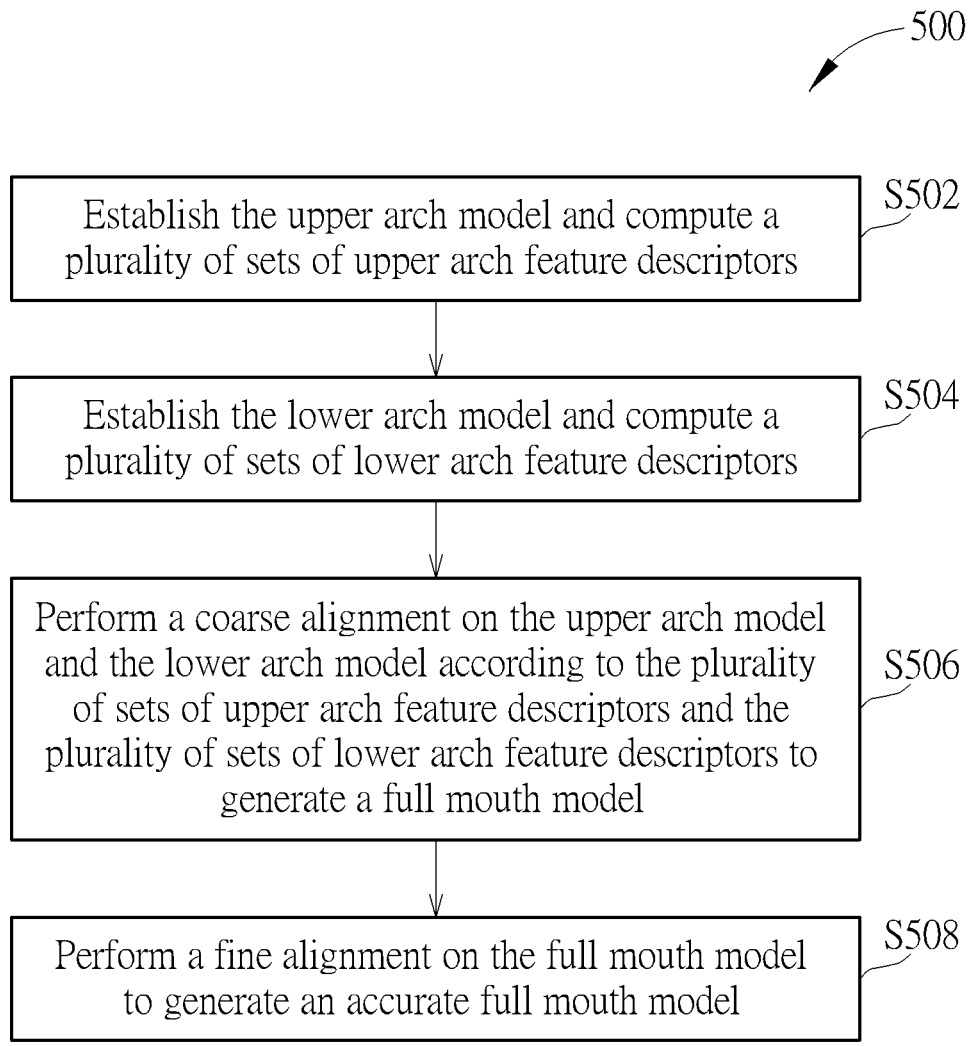
FIG. 5 is a flowchart of a method of operating the intraoral scanner in FIG. 1.

FIG. 5 is a flowchart of a method 500 of operating the intraoral scanner 10. The method 500 includes Steps S502 to S508 for generating an accurate full mouth model. Any reasonable Step change or adjustment is within the scope of the disclosure. Steps S502 to S508 are detailed as follows:

Step S502: Establish the upper arch model and compute a plurality of sets of upper arch feature descriptors;

Step S504: Establish the lower arch model and compute a plurality of sets of lower arch feature descriptors;

Step S506: Perform a coarse alignment on the upper arch model and the lower arch model according to the plurality of sets of upper arch feature descriptors and the plurality of sets of lower arch feature descriptors to generate a full mouth model;

Step S508: Perform a fine alignment on the full mouth model to generate an accurate full mouth model.

Figure 7:
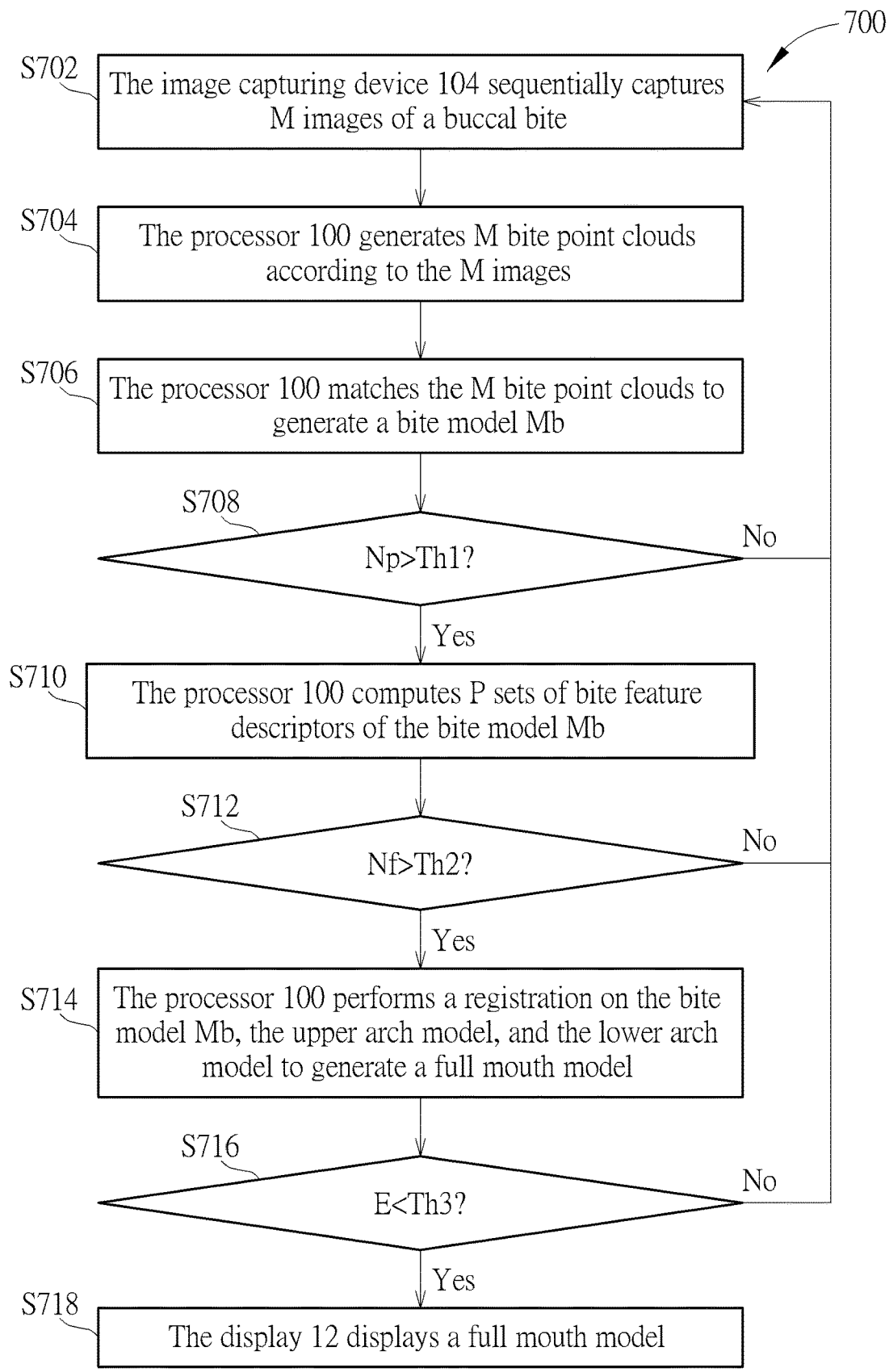
FIG. 7 is a flowchart of another method of operating the intraoral scanner in FIG. 1.
Figure 8:
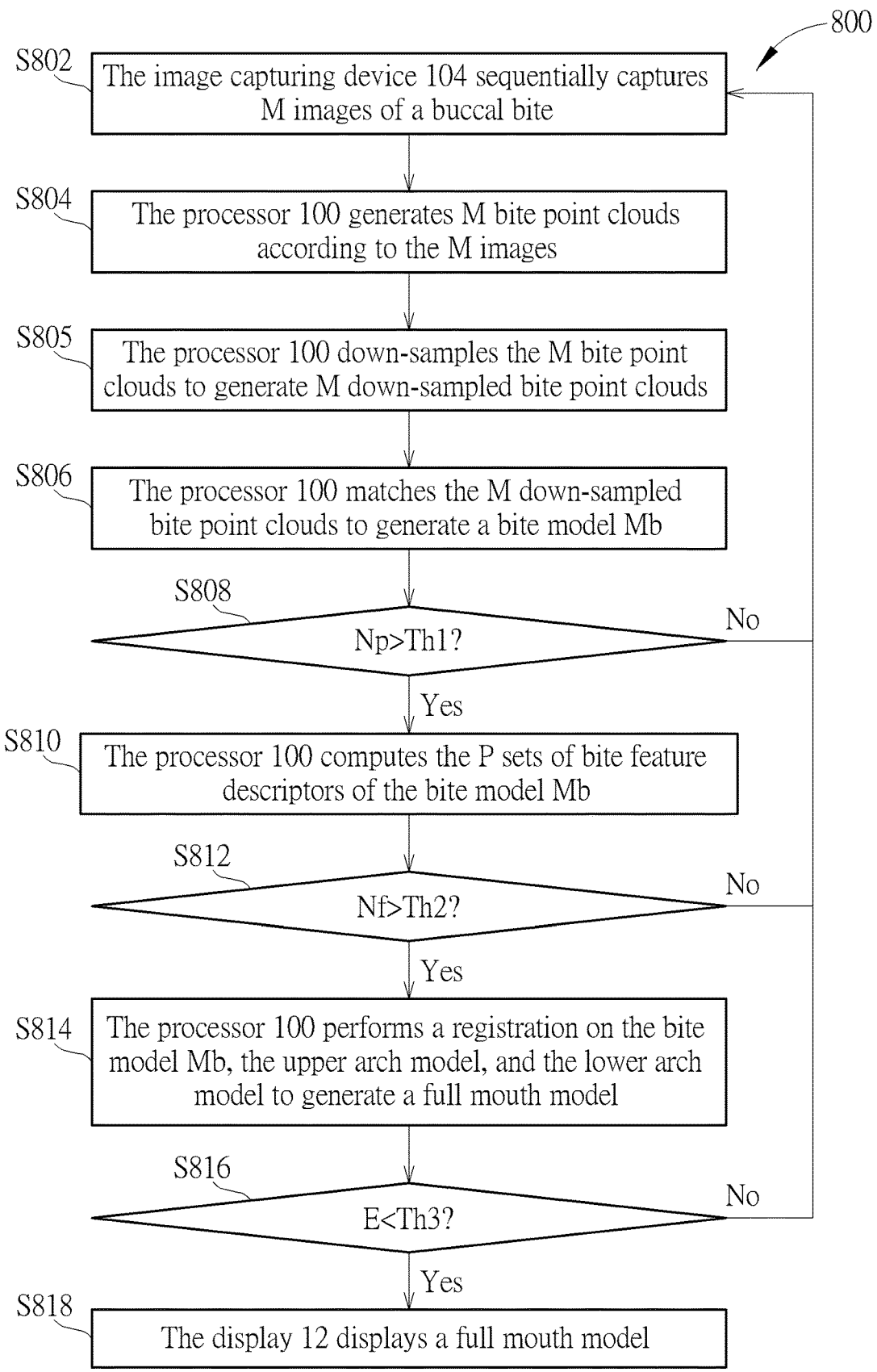
FIG. 8 is a flowchart of another method of operating the intraoral scanner in FIG. 1.

In Step S502, the processor 100 computes a set of upper arch feature descriptors for each data point in the upper arch model, and sequentially computes a plurality of sets of upper arch feature descriptors for all data points in the upper arch model, each set of upper arch feature descriptors describing a geometric relationship between a point of interest and surrounding data points thereof in the upper arch model. In some embodiments, the processor 100 may first down-sample all data points of the upper arch model to generate a plurality of down-sampled data points of the upper arch model, and sequentially compute the plurality of sets of upper arch feature descriptors for the plurality of down-sampled data points of the upper arch model. Down-sampling may reduce the amount of computations for the processor 100 to reduce the time for generating the plurality of sets of upper arch feature descriptors. The plurality of sets of upper arch feature descriptors may be stored in the memory 106. In Step S504, the processor 100 computes a set of lower arch feature descriptors for each data point in the lower arch model, and sequentially computes a plurality of sets of lower arch feature descriptors for all data points in the lower arch model, each set of lower arch feature descriptors describing a geometric relationship between a point of interest and surrounding data points thereof in the lower arch model. In some embodiments, the processor 100 may first down-sample all data points of the lower arch model to generate a plurality of down-sampled data points of the lower arch model, and sequentially compute a plurality of sets of lower arch feature descriptors for the plurality of down-sampled data points of the lower arch model. Down-sampling may reduce the amount of computations of the processor 100 and reduce the time for generating the plurality of sets of lower arch feature descriptors. The plurality of sets of lower arch feature descriptors may be stored in the memory 106. In Step S506, the processor 100 loads the plurality of sets of upper arch feature descriptors and the plurality of sets of lower arch feature descriptors from the memory 106, and performs a coarse alignment on the upper arch model and the lower arch model according to the plurality of sets of upper arch feature descriptors and the plurality of sets of lower arch feature descriptors to generate the full mouth model. The coarse alignment may align a part of the upper teeth in the upper arch model with a part of the lower teeth in the lower arch model. FIGS. 7 and 8 show two methods to achieve the coarse alignment, and will be explained in the following paragraphs. In Step S508, the processor 100 performs a fine alignment on the full mouth model according to the matching algorithm to generate an accurate full mouth model. The matching algorithm may be, for example, an iterative closest point algorithm.

Each set of upper arch feature descriptors or each set of lower arch feature descriptors may include a set of point feature histogram (PFH) data or a set of fast point feature histogram (FPFH) data. A point feature histogram shows the distribution of the geometric relationship between a point of interest and the surrounding data points. The point feature histogram is invariant to the rotational transformation and translational transformation of the point cloud in the 3D space, and may be resistible to the effects of various levels of sampling and various levels of noise. The fast point feature histogram is a simplified version of the point feature histogram. The amount of computation is reduced considerably by simplifying and optimizing the calculation, while retaining most features of the point feature histogram.

Figure 6A:
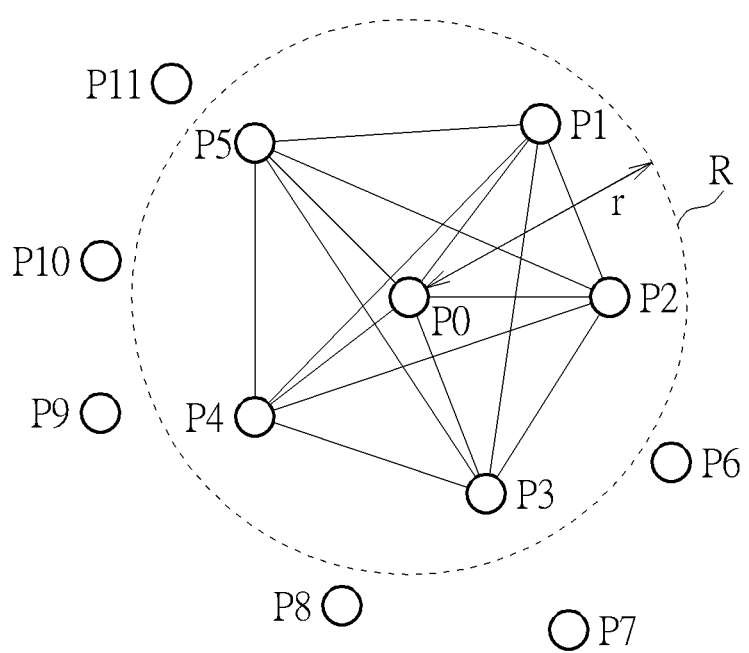
FIG. 6A is a schematic diagram of a method of computing a set of point feature histogram data.
Figure 6B:
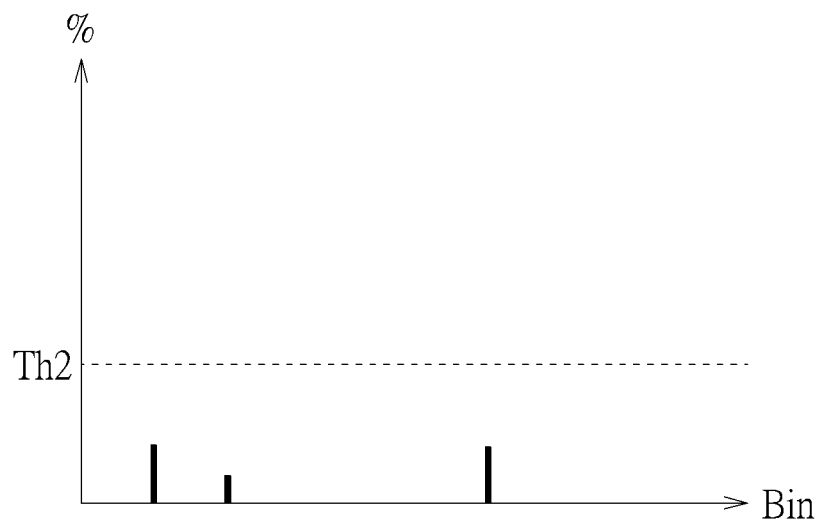
FIG. 6B is a histogram plotted according to the set of point feature histogram data generated from FIG. 6A.

FIG. 6A is a schematic diagram of a method of computing a set of point feature histogram data. FIG. 6A shows data points P0 to P11. The data points P0 to P11 may be data points in a point cloud, and the data point P0 may be a point of interest. When computing a set of point feature histogram data for the data point P0, the processor 100 may determine a range R centered at the data point P0 and the surrounding data points P1 to P5 in the range R, and compute a set of feature descriptors for any pair of data points in the data points P0 to P5 to obtain a 15 (=6*5/2) sets of feature descriptors, and sort the 15 sets of feature descriptors into bins to generate feature histogram data of the set of data points P0. The range R may be, but is not limited to, a spherical range with a radius r. The range R may be set according to a point cloud density. When the point cloud density is small, the range R may be set to a larger value; when the point cloud density is large, the range R may be set to a smaller value. In some embodiments, each set of feature descriptors may include 3 direction angles with respect to a pair of corresponding normals of a pair of data points, and the sorting method may include dividing each directional angle into equal parts at a predetermined interval, e.g., into five parts to obtain 125 (=5*5*5) histogram bins, then sorting the 3 direction angles of each set of feature descriptors to one of 125 histogram bins, and sort the 15 sets of feature descriptors by the same way to generate a set of point feature histogram data. In other embodiments, each set of feature descriptors may include a distance and the 3 direction angles with respect to the pair of corresponding normals, and the sorting method may include dividing a distance range and each directional angle into equal parts at a predetermined interval, e.g., into five parts to obtain 625 (=5*5*5*5) histogram bins, then sorting the distance and the 3 direction angles of each set of feature descriptors to one of 625 histogram bins, and sorting the 15 sets of feature descriptors by the same way to generate a set of point feature histogram data. In other embodiments, each set of feature descriptors may include a plurality of parameters, each parameter may include a maximum parameter range that can be divided at a fixed interval or a variable interval to provide a plurality of histogram bins, and then each set of feature descriptors may be sorted into one of the plurality of histogram bins, and the 15 sets of feature descriptors may be sorted by the same way to generate a set of point feature histogram data. Each set of point feature histogram data may be plotted into a histogram. FIG. 6B is a histogram plotted according to the set of point feature histogram data generated from FIG. 6A, where the horizontal axis represents the histogram bin, and the vertical axis represents the data point ratio (%) of each set of feature descriptors. FIG. 6B shows that the set of histogram data is classified into 3 histogram bins. If the histogram shows that all pieces of histogram data are less than the second threshold Th2, the data point P0 is located closely to a substantially flat surface; if the histogram shows that one or more pieces of histogram data are greater than the second threshold Th2, the data point P0 is located closely to a feature point of the tooth, e.g., located closely to an edge or a corner of the tooth.

FIG. 7 is a flowchart of another method 700 of operating the intraoral scanner 10. The method 700 includes Steps S702 to S718 for use to realize Step S506 in FIG. 5. Steps S702 to S706 are used to generate the bite model Mb. Steps S708 to S714 are used to determine when to perform a registration on the upper arch model and the lower arch model. Steps S716 and S718 are used to determine the completion of the full mouth model. Any reasonable step change or adjustment is within the scope of the disclosure. Steps S702 to S718 are detailed as follows:

Step S702: The image capturing device 104 sequentially captures M images of a buccal bite;

Step S704: The processor 100 generates M bite point clouds according to the M images;

Step S706: The processor 100 matches the M bite point clouds to generate a bite model Mb;

Step S708: The processor 100 determines whether the number of data points Np of the bite model Mb exceeds a first threshold Th1? If so, go to Step S710; if not, go to Step S702;

Step S710: The processor 100 computes P sets of bite feature descriptors of the bite model Mb;

Step S712: The processor 100 determines whether a predetermined number Nf of bite feature descriptors in a set of bite feature descriptors of the P sets of bite feature descriptors exceeds a second threshold Th2? If so, go to Step S714; and if not, go to Step S702;

Step S714: The processor 100 performs a registration on the bite model Mb, the upper arch model, and the lower arch model to generate a full mouth model;

Step S716: The processor 100 determines whether a registration error E is less than the third threshold Th3? If so, go to Step S718; and if not, go to Step S702;

Step S718: The display 12 displays a full mouth model.

When the intraoral scanner 10 is used to establish the bite model Mb, the image capturing device 104 sequentially captures M images of the buccal bite of the upper and lower arches (Step S702). The processor 100 generates M bite point clouds according to the M images (Step S704), and matches the M bite point clouds using the matching algorithm to generate a bite model Mb (Step S706). Next, in Step S708, the processor 100 determines whether the number of data points Np of the bite model Mb exceeds the first threshold Th1. In some embodiments, the first threshold Th1 may be 12,000. When the number of data points Np is less than or equal to the first threshold Th1, the number of data points Np may be insufficient for a registration, and the intraoral scanner 1 continues to scan the buccal bite and generate an bite model Mb (Steps S702 to S706); when the number of data points Np exceeds the first threshold Th1, the number of data points Np may be sufficient for a registration, and the processor 100 computes P sets of bite feature descriptors of P point cloud data points of the bite model Mb for the point cloud data points of the bite model Mb (Step S710). In some embodiments, in Step S710, the intraoral scanner 1 may simultaneously compute the P sets of bite feature descriptors and continue to scan the buccal bite to generate the bite model Mb. Each set of bite feature descriptors may include a set of point feature histogram data or a set of fast point feature histogram data.

In Step S712, the processor 100 determines whether a predetermined number Nf of bite feature descriptors in a set of bite feature descriptors of the P sets of bite feature descriptors exceeds a second threshold Th2. For example, the second threshold Th2 may be 30%, 40%, or other proportions, and the predetermined number Nf may be 2000 or other numbers. When the number of bite feature descriptors in the set of bite feature descriptors exceeding the second threshold Th2 (such as 30%) is less than the predetermined number Nf (such as less than 2000), the bite model Mb may include a tooth surface but not a tooth feature point, and does not include the upper arch and the lower arch at the same time, the intraoral scanner 1 continues to scan the buccal bite to generate the bite model Mb and compute more sets of bite feature descriptors (Steps S702 to S710). When the number of bite feature descriptors in the set of bite feature descriptors exceeding the second threshold Th2 (such as 30%) exceeds the predetermined number Nf (such as more than 2000), the bite model Mb may include tooth feature points and may include a partial upper arch and a partial lower arch at the same time, the processor 100 performs a registration on the bite model Mb, the upper arch model and the lower arch model to generate a full mouth model (Steps S714). In some embodiments, in Step S714, the intraoral scanner 1 may simultaneously perform the registration on the bite model Mb, the upper arch model, and the lower arch model, and continue to scan the buccal bite and generate the bite model Mb. The registration algorithm may be a random sample consensus (RANSAC) algorithm. The processor 100 performs the registration according to the P sets of bite feature descriptors of the bite model Mb and the upper arch feature descriptors of the upper arch model to generate a corrected upper arch model, performs the registration according to the P sets of bite feature descriptors of the bite model Mb and the lower arch feature descriptors of the lower arch model to generate a corrected lower arch model, and combines the corrected upper arch model and the corrected lower arch model to generate a full mouth model. Specifically, if the processor 100 may use the registration algorithm to find a set of upper arch feature descriptors from the sets of upper arch feature descriptors of the upper arch model to match with a set of bite arch feature descriptors from the P sets of bite arch feature descriptors of the bite model, then the corrected upper arch model will be generated. If the processor 100 has found a set of lower arch feature descriptors from the lower arch model to match with a set of bite arch feature descriptors from the bite model using the registration algorithm, then the corrected lower arch model will be generated. Later, the processor 100 combines the corrected upper arch model and the corrected lower arch model to generate the full mouth model and the registration error E of the full mouth model. The registration error E may be the maximum gap between the corrected upper arch model and the corrected lower arch model and/or the maximum overlapping length between the corrected upper arch model and the corrected lower arch model. In some embodiments, the processor 100 generates a registration confidence parameter after performing the registration on the bite model Mb, the upper arch model, and the lower arch model. When the processor 100 determines that the registration confidence parameter of the full mouth model reaches the fourth threshold, the full mouth model has a high degree of accuracy, and the processor 100 computes the registration error E of the full mouth model. When the processor 100 determines that the registration confidence parameter of the full mouth model has not reached the fourth threshold, the full mouth model has a low accuracy, and the intraoral scanner 1 repeats Steps S702 to S714. In some embodiments, the threshold may be set to 0.98.

In Step S716, if the registration error E is less than the third threshold Th3, the full mouth model is determined as accurate, and the display 12 displays the full mouth model (Step 718). If the registration error E is greater than or equal to the third threshold Th3, the full mouth model is determined as inaccurate, and the intraoral scanner 1 repeats Steps S702 to S716. In some embodiments, the registration error E may be the maximum gap between the corrected upper arch model and the corrected lower arch model, and the third threshold Th3 may be set to 3%, 5%, or other ratios. In other embodiments, the registration error E may be the maximum overlapping length between the corrected upper arch model and the corrected lower arch model, and the third threshold Th3 may be set to zero. In some embodiments, when the registration error E is less than the third threshold Th3, the intraoral scanner 10 may notify the operator that the reconstruction of the full mouth model is complete, and the scan procedure may be terminated.

Since the registration procedure is computation-intensive and complicated, the method 700 waits until sufficient number of data points Np of the bite model Mb are accumulated before generating representative bite feature descriptors. Only after the predetermined number Nf of bite feature descriptors exceeds the second threshold Th2, the method 700 starts detecting the feature points of the tooth and performing the registration process. Therefore, the registration process is performed only when sufficient bite model is obtained, thereby reducing the amount of computations of the intraoral scanner 10, reducing the time required for reconstructing a full mouth model, enhancing the quality of a full mouth scan and reducing discomfort of a patient.

FIG. 8 is a flowchart of another method 800 of operating the intraoral scanner 10. The method 800 includes Steps S802 to S818 for use to realize Step S506 in FIG. 5. Steps S802 to S806 are used to generate the bite model Mb. Steps S808 to S814 are used to determine when to perform a registration on the upper arch model and the lower arch model. Steps S816 and S818 are used to determine the completion of the full mouth model. Any reasonable step change or adjustment is within the scope of the disclosure. Steps S802 to S818 are detailed as follows:

Step S802: The image capturing device 104 sequentially captures M images of a buccal bite;

Step S804: The processor 100 generates M bite point clouds according to the M images;

Step S805: The processor 100 down-samples the M bite point clouds to generate M down-sampled bite point clouds;

Step S806: The processor 100 matches the M down-sampled bite point clouds to generate a bite model Mb;

Step S808: The processor 100 determines whether the number of data points Np of the point cloud data points of the bite model Mb exceeds a first threshold Th1? If so, go to Step S810; if not, go to Step S802;

Step S810: The processor 100 computes the P sets of bite feature descriptors of the bite model Mb;

Step S812: The processor 100 determines whether a predetermined quantity Nf of bite feature descriptors in a set of bite feature descriptors of the P sets of bite feature descriptors exceeds a second threshold Th2? If so, go to Step S814; and if not, go to Step S802;

Step S814: The processor 100 performs a registration on the bite model Mb, the upper arch model, and the lower arch model to generate a full mouth model;

Step S816: The processor 100 determines whether a registration error E is less than the third threshold Th3? If so, go to Step S818; and if not, go to Step S802;

Step S818: The display 12 displays a full mouth model.

The difference between the operation method 800 and the operation method 700 lies in that the operation method 800 down-samples the bite point cloud in Step S805 and uses the down-sampled bite point cloud to generate the bite model Mb in Step S806, thereby further reducing the amount of computations of the intraoral scanner 1 and reducing the time for generating a full mouth model. The Steps S802, S804, S808 to S818 of the method 800 are similar to the Steps S702, S704, and S708 to 718 of the method 700, explanations therefor can be found in the preceding paragraphs and will not be repeated here.

The method 800 uses the down-sampled bite point cloud to generate the bite model Mb, further reducing the amount of the computations of the intraoral scanner 1, speeding up reconstruction of the full mouth model, enhancing the quality of a full mouth scan and relieving a patient's discomfort.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating an intraoral scanner, the intraoral scanner comprising an image capturing device and a processor, the method comprising:
   the image capturing device sequentially capturing M images of a buccal bite;
   the processor generating M bite point clouds according to the M images;
   the processor matching the M bite point clouds to generate a bite model;
   when a quantity of data points of the bite model exceeds a first threshold, the processor computing P sets of bite feature descriptors of the bite model; and
   when a predetermined quantity of bite feature descriptors in a set of bite feature descriptors of the P sets of bite feature descriptors exceeds a second threshold, the processor performing a registration on an upper arch model and a lower arch model to the buccal model to generate a full mouth model;
   wherein M and P are positive integers.

2. The method of claim 1, wherein the processor performing the registration on the bite model, the upper arch model, and the lower arch model to generate the full mouth model comprises:
   the processor performing the registration according to the P sets of bite feature descriptors of the bite model and a plurality of sets of upper arch feature descriptors of the upper arch model to generate a corrected upper arch model;
   the processor performing the registration according to the P sets of bite feature descriptors of the bite model and a plurality of sets of lower arch feature descriptors of the lower arch model to generate a corrected lower arch model; and
   the processor combining the corrected upper arch model and the corrected lower arch model to generate the full mouth model.

3. The method of claim 2, further comprising:
   when the processor determines that a registration error of the full mouth model is less than a third threshold, displaying the full mouth model on a display.

4. The method of claim 3, wherein the registration error is a maximum gap between the corrected upper arch model and the corrected lower arch model.

5. The method of claim 3, wherein the registration error is a maximum overlapping length between the corrected upper arch model and the corrected lower arch model.

6. The method of claim 2, further comprising:
   the processor performing a registration on the bite model, the upper arch model, and the lower arch model to generate a registration confidence parameter; and
   when the processor determines that the registration confidence parameter of the full mouth model reaches a fourth threshold, the processor computing a registration error of the full mouth model.

7. The method of claim 6, further comprising:
   when the processor determines that the registration error is less than a third threshold, displaying the full mouth model on a display.

8. The method of claim 7, wherein the registration error is a maximum gap or a maximum overlapping length between the corrected upper arch model and the corrected lower arch model.

9. The method of claim 2, wherein each set of bite feature descriptors includes a plurality pieces of point feature histogram (PFH) data or a plurality pieces of fast point feature histogram (FPFH) data, each set of upper arch feature descriptors includes a plurality pieces of point feature histogram (PFH) data or a plurality pieces of fast point feature histogram (FPFH) data, and each set of lower arch feature descriptors includes a plurality pieces of point feature histogram (PFH) data or a plurality pieces of fast point feature histogram (FPFH) data.

10. A method of operating an intraoral scanner, the intraoral scanner comprising an image capturing device and a processor, the method comprising:
    the image capturing device sequentially capturing M images of a buccal bite;
    the processor generating M sets of bite point clouds according to the M images;
    the processor down-sampling the M bite point clouds to generate M down-sampled bite point clouds;
    the processor matching the M down-sampled bite point clouds to generate a bite model;
    when a quantity of data points of the bite model exceeds a first threshold, the processor computing P sets of bite feature descriptors of the bite model; and
    when a predetermined quantity of bite feature descriptors in a set of bite feature descriptors of the P sets of bite feature descriptors exceeds a second threshold, the processor performing a registration on an upper arch model and a lower arch model to the buccal model to generate a full mouth model;
    wherein M and P are positive integers.

11. The method of claim 10, wherein the processor performing the registration on the bite model, the upper arch model, and the lower arch model to generate the full mouth model comprises:

the processor performing the registration according to the P sets of bite feature descriptors of the bite model and a plurality of sets of upper arch feature descriptors of the upper arch model to generate a corrected upper arch model;

the processor performing the registration according to the P sets of bite feature descriptors of the bite model and a plurality of sets of lower arch feature descriptors of the lower arch model to generate a corrected lower arch model; and the processor combining the corrected upper arch model and the corrected lower arch model to generate the full mouth model.

12. The method of claim 11, further comprising:

when the processor determines that a registration error of the full mouth model is less than a third threshold, displaying the full mouth model on a display.

13. The method of claim 12, wherein the registration error is a maximum gap between the corrected upper arch model and the corrected lower arch model.

14. The method of claim 12, wherein the registration error is a maximum overlapping length between the corrected upper arch model and the corrected lower arch model.

15. The method of claim 11, further comprising:

the processor performing a registration on the bite model, the upper arch model, and the lower arch model to generate a registration confidence parameter; and when the processor determines that the registration confidence parameter of the full mouth model reaches a fourth threshold, the processor computing a registration error of the full mouth model.

16. The method of claim 15, further comprising:

when the processor determines that the registration error is less than a third threshold, displaying the full mouth model on a display.

17. The method of claim 16, wherein the registration error is a maximum gap or a maximum overlapping length between the corrected upper arch model and the corrected lower arch model.

18. The method of claim 11, wherein each set of bite feature descriptors includes a plurality pieces of point feature histogram (PFH) data or a plurality pieces of fast point feature histogram (FPFH) data, each set of upper arch feature descriptors includes a plurality pieces of point feature histogram (PFH) data or a plurality pieces of fast point feature histogram (FPFH) data, and each set of lower arch feature descriptors includes a plurality pieces of point feature histogram (PFH) data or a plurality pieces of fast point feature histogram (FPFH) data.

* * * * *